United States Patent [19]

Hilsum et al.

[11] Patent Number: 4,838,662
[45] Date of Patent: Jun. 13, 1989

[54] LIGHT SWITCHES UTILIZING ANISOTROPIC EMISSION

[75] Inventors: Cyril Hilsum, Pinner; Robert L. Van Ewyk, Rickmansworth; Ingrid M. O'Connor, London, all of England

[73] Assignee: The General Electric Company, p.l.c., United Kingdom

[21] Appl. No.: 186,366

[22] Filed: Apr. 26, 1988

Related U.S. Application Data

[63] Continuation of Ser. No. 800,452, Nov. 21, 1985, abandoned.

[30] Foreign Application Priority Data

Nov. 28, 1984 [GB] United Kingdom ............... 8429991

[51] Int. Cl.[4] .................................................. G02F 1/137
[52] U.S. Cl. ....................... 350/350 F; 252/299.1; 252/299.5; 350/350 R
[58] Field of Search ............... 350/350 R, 350 F, 345, 350/349; 252/299.1, 299.5

[56] References Cited

U.S. PATENT DOCUMENTS

| | | | |
|---|---|---|---|
| 3,864,022 | 2/1975 | Moriyama et al. | 252/299.5 |
| 4,208,106 | 6/1980 | Oh | 350/345 |
| 4,211,473 | 7/1980 | Shanks | 350/345 |
| 4,336,980 | 6/1982 | Funada et al. | 350/345 |
| 4,337,999 | 7/1982 | Funada et al. | 350/345 |
| 4,378,302 | 3/1983 | Aftergut et al. | 252/299.5 |
| 4,416,515 | 11/1983 | Funada et al. | 350/350 F |
| 4,425,029 | 1/1984 | Funada et al. | 350/350 F |
| 4,454,057 | 6/1984 | Kaneko et al. | 350/345 |
| 4,556,287 | 12/1985 | Funada et al. | 350/350 F |

FOREIGN PATENT DOCUMENTS 0047027 10/1982 European Pat. Off. .

OTHER PUBLICATIONS

Hockbaum et al, "Fluorescence of Guest Molecules in a Scattering State of a Liquid Crystal", *Journal of Applied Physics*, vol. 51, No. 2, Feb. 1980, pp. 867–872.

Primary Examiner—Rodney B. Bovernick
Assistant Examiner—Martin Lerner
Attorney, Agent, or Firm—Kirschstein, Ottinger, Israel & Schiffmiller

[57] ABSTRACT

A display device is described which comprises a liquid crystal host material and an anisotropically emitting fluorescent guest material dissolved in the host material such that the molecules of the guest material align with the molecules of the host material. An electric field applied across the host material causes the direction of radiation emitted by the guest material incident on an interface between two materials of different refractive index to vary so as to control the amount of radiation emitted by the display.

10 Claims, 2 Drawing Sheets

LIGHT SWITCHES UTILIZING ANISOTROPIC EMISSION

This is a continuation of application Ser. No. 800,452 filed Nov. 21, 1985, now abandoned.

BACKGROUND OF THE INVENTION

1. Field of the Invention

This invention relates to display devices.

In particular the invention relates to display devices which may be switched between light emitting and non-light emitting conditions.

2. Description of the Related Art

In U.S. Pat. No. 4,211,473 there is described a liquid crystal display device comprising a liquid crystal host material in which a pleochroic fluorescent dye is dissolved such that the molecules of the dye align with the molecules of the liquid crystal host material, the liquid crystal material being contained between two parallel glass plates, a reflector being arranged on one of these plates effective to reflect light incident on the reflector back through the device. By applying an electric field across the device effective to rotate the molecules of the liquid crystal host material, the amount of light absorbed by the dye through the plate which does not carry the reflector may be varied, the amount of fluorescence emitted by the dye, and thus the display varying correspondingly.

Such a display suffers the disadvantage however that the amount of fluorescence emitted by the dye will vary with the rotation of the dye molecules, and thus the applied electric field, according to a cosine law. Thus the variation of contrast of the display with applied electric field is gradual rather than sudden.

SUMMARY OF THE INVENTION

It is an object of the present invention to provide a liquid crystal display device wherein this disadvantage is at least alleviated.

According to the present invention a display device comprising a liquid crystal host material; a luminescent guest material dissolved in the host material such that the molecules of the guest material substantially align with the molecules of the host material; and means for applying an electric field across the host material, is characterised in that the guest material emits radiation anisotropically, and the means for applying an electric field is effective to rotate the host material molecules between a first position at which the radiation emitted by the guest material is incident on an interface between two materials of different refractive index at an angle less than the critical angle for the interface, and a second position at which the radiation emitted by the guest is incident on the interface at an angle greater than the critical angle so as to switch the device between a radiation emitting and a non-radiation emitting condition.

BRIEF DESCRIPTION OF THE DRAWINGS

Two display devices in accordance with the invention will now be described by way of example only, with reference to the accompanying drawings in which.

DETAILED DESCRIPTION OF THE PREFERRED EMBODIMENTS

Figure 1:
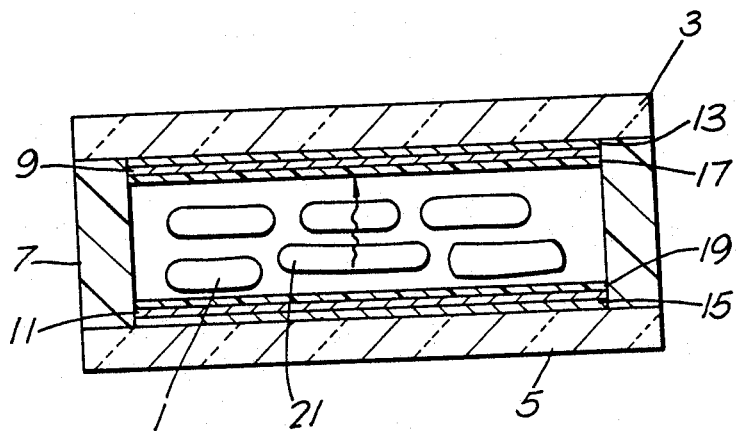
FIG. 1 is a schematic diagram of the first device.

Referring to FIG. 1 the first display device comprises a nematic liquid crystal host 1 "E7" a mixture based on cyanobiphenyls supplied by BDH Chemicals Ltd. Poole, England, this material having a positive dielectric anisotropy. The liquid crystal material "E7" may be further identified as:

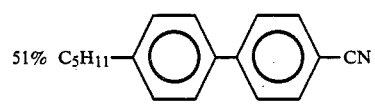

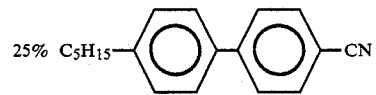

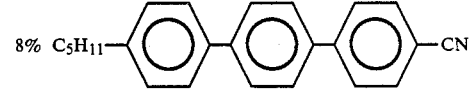

The liquid crystal is contained between two spaced parallel glass plates 3, 5 sealed around their edges by a seal 7 incorporating spacer particles of glass or carbon fibres. The two plates 3, 5 each carry on their inner surface a respective thin transparent electrode 9, 11 respective barrier layers of $SiO_2$ 13, 15 being interposed between each plates 3, 5 and corresponding electrode so as to prevent migration of sodium ions from the glass plate into the liquid crystal host 1. On the inner surface of each electrode 9, 11 there are formed respective thin layers 17, 19 of polyimide which are effective to define the orientation of the liquid crystal molecules in the absence of an applied electric field.

In the crystal 1 there is dissolved a fluorescent guest 21 in the form of a 1.0 weight percent solution of perylene diphenylnoryl ester whose structure is shown below, i.e. the dye 3,10-Bis[4¹-nonylphenyl] perylene dicarboxylate.

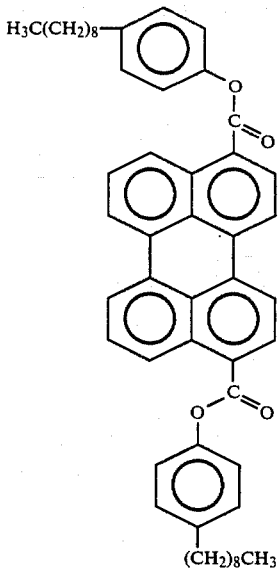

A small amount, 0.14 weight percent of the cholesteric material "CB15" from BDH Chemicals Ltd., Poole, England is also added to the liquid crystal guest material 1 to prevent reverse twist from occuring.

The fluorescent guest 21 has a preferred direction of polarization along its long axis, and will align itself with this long axis parallel to the axis of alignment of the molecules of the liquid crystal host. A voltage supply (not shown) is also provided in order to enable an electric field to be applied across the electrodes.

In use of the display, a low energy U.V. source is used to illuminate the display, the light emitted by the source being absorbed primarily by the liquid crystal host material. By means of an energy transfer mechanism between the molecules of the host and guest materials, the light absorbed by the liquid crystal host material will cause the guest molecules 21 to fluoresce at a wavelength of about 520 nm.

When no field is applied across the electrodes 9, 11, the liquid crystal molecules, and thus the long axis of the guest 13 will be substantially parallel to the plates 3, 5 as indicated in FIG. 1 with the preferred direction of emission of light being perpendicular to the plates. Thus light will be emitted by the display device through the electrode 9 and plate 3.

When an electric field is applied across the electrodes 9, 11, however, the liquid crystal molecules will turn to lie along the field perpendicular to the plates 3, 5 the molecules of the guest 21 turning with the liquid crystal molecules. The light emitted by the guest 13 will thus initially continue to be emitted by the device through the electrode 9 and plate 3, but will be subsequently totally internally reflected by the external surface of the glass plate 3 as the angle which the light emitted by the guest molecules 13 makes with the normal to the plate 3 increases beyond the critical angle for the glass plate 3/air interface.

Figure 2:
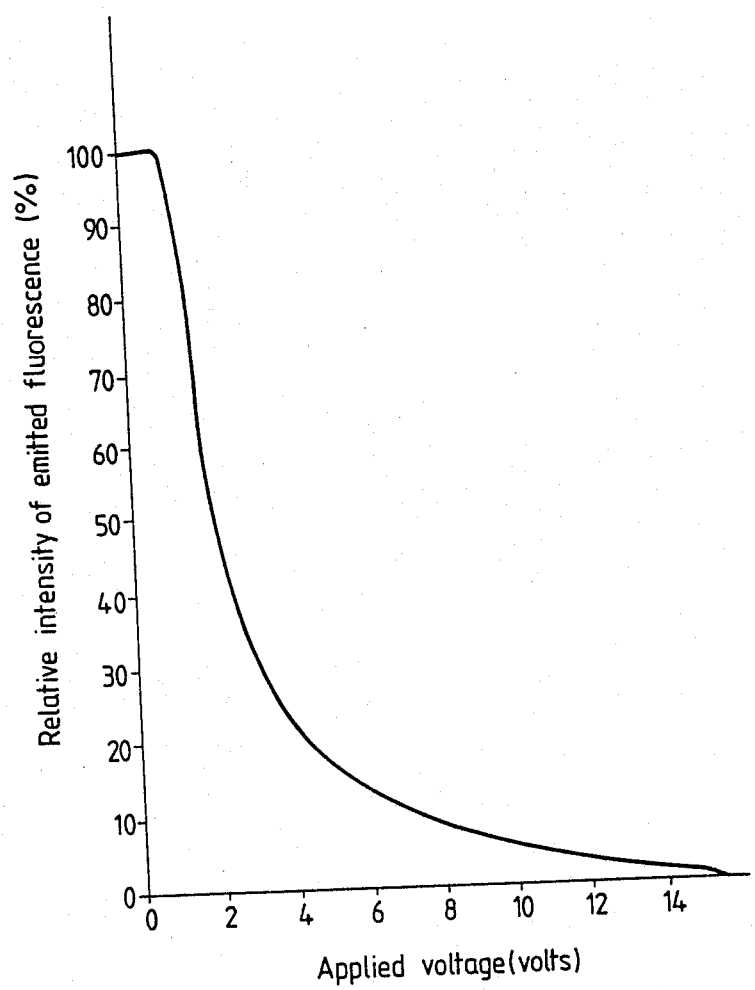
FIG. 2 is a plot of the radiation output of the first device as a function of a voltage applied across the device.

Thus the plot of the intensity of the fluorescence emitted by the display against the voltage applied across the electrodes is of the form shown in FIG. 2. It can be seen that for applied voltages of up to 1 volt there is very little change in emitted intensity, whilst there is an approximately 50% reduction in emitted intensity for an increase in voltage between 1 and 2 volts, this being the voltage range at which the critical angle is exceeded.

It will be appreciated that the energy transfer mechanism used in this particular display is particularly advantageous as the concentration of the liquid crystal material 1 within the display is much greater than that of the fluorescent guest 21, and a high fluorescence intensity is achieved with lower illumination levels than would be the case when the guest molecules are the primary incident illumination absorbers. Furthermore there will also be a greater difference in wavelength between the illuminating incident light and the fluorescence emitted by the display, thus improving the contrast of the display.

It will also be appreciated that alternative fluorescent guest materials may be used in the first display described.

One such example is the dye di-n-butyl perylenedicarboxylate whose structure is shown below.

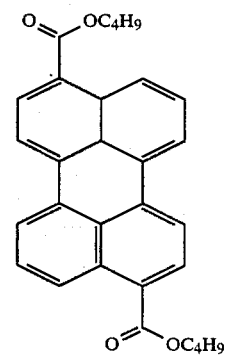

Figure 3:
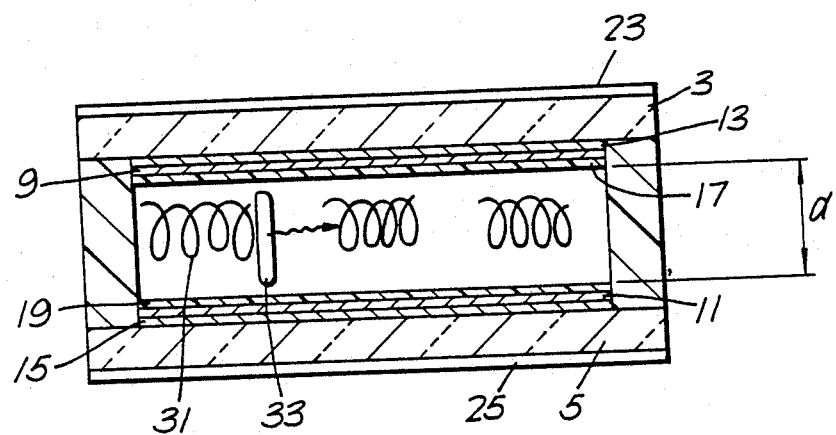
FIG. 3 is a schematic diagram of the second device.

Referring now to FIG. 3, the second display device to be described is of similar form to the first device, and corresponding components are thus correspondingly labelled.

The nematic liquid crystal employed in the first device however is replaced by a cholesteric liquid crystal 31 such as the nematic liquid crystal "ZLI 1695" produced by Merck together with a sufficient amount of the cholesteric crystal "CB15" produced by BDM Chemicals Ltd. to produce a cholesteric phase. This liquid crystal has a positive dielectric anisotropy with its helical axis aligned perpendicular to the plates 3, 5. The dimension d i.e. cell thickness, of the device and the amount of "CB15" is chosen such that the ratio of the cell thickness to the pitch of the crystal is around 3. A fluorescent guest material 33 such as either of the dyes mentioned hereabove in relation to the first display device, is dissolved in this cholesteric liquid crystal such that its preferred direction of polarisation is aligned with the helical axis of the liquid crystal as indicated in FIG. 3.

In operation of the second device, the device is illuminated by low intensity U.V. light, in this second device the necessary absorption being carried out primarily by the fluorescent guest material.

In the absence of an electric field across the crystal 31 no light will be emitted from the display device, the light emitted by the guest molecules 33 being absorbed in the absence of scatter by the seal 7.

If an electric field is applied across the crystal however, when the liquid crystal molecules 31 and thus the guest molecules 33 are turned such that the angle which the light emitted by the guest molecules makes with the normal to the plate 3 decreases beyond the critical angle for the glass plate 3/air interface, light from the guest 33 will be emitted from the device, this change being relatively abrupt as in the first device.

It will be appreciated that many other display devices in accordance with the invention are possible, for example display systems incorporating a smectic liquid crystal.

It will also be appreciated that a diffuser may be incorporated on or in a display device in accordance with the invention in order to increase the emission angle of the radiation emitted by the luminescent guest, although any such diffuser will have to be designed so that it does not prevent total internal reflection where this is required. Such a diffuser is shown as 23 in FIG. 3.

It will also be appreciated that in some circumstances it may also be useful to incorporate a reflector in the device as shown as 25 in FIG. 3.

It will also be appreciated the in some circumstances it will be desirable to dissolve two or more different luminescent guests in the liquid crystal host, thus allowing the display device to emit light of differing wavelengths.

It will also be appreciated that whilst in the devices described by way of example, the relevant critical angle is for a glass plate/air interface. Alternative display devices in accordance with the invention may use any interface between two materials of different refractive index on which radiation emitted by the luminescent guest material is incident.

It will also be appreciated that whilst in the device described by way of example, the liquid crystal host materials have a positive dielectric anisotropy, a device in accordance with the invention may equally incorporate a liquid crystal host material having a negative dielectric anisotropy.

It will be appreciated that whilst the two displays described heretofore by way of example are excited by illumination in the U.V., displays in accordance with the invention excitable by incident radiation of different wavelengths are possible. The use of U.V. radiation however is particularly advantageous in some applications, such as in aircraft cockpits during night flight conditions as light of this wavelength will not interfere with the operation of infra-red image intensifiers.

What we claim is:

1. A display device, comprising:
   (A) a liquid crystal host material having molecules;
   (B) a luminescent guest material having molecules, said guest material emitting radiation anisotropically and being dissolved in said host material such that the molecules of said guest material substantially align with the molecules of said host material; and
   (C) means for applying an electric field across said host material to rotate said molecules of said host material between
      (i) a first position at which the radiation emitted by said guest material is incident on an interface between two materials of different refractive indices at an angle less than the critical angle for said interface, and
      (ii) a second position at which the radiation emitted by said guest material is incident on said interface at an angle greater than said critical angle,
   whereby the device is switched between a radiation-emitting condition and a non-radiation-emitting condition.

2. A device according to claim 1 in which the guest material is fluorescent.

3. A device according to claim 1 in which one of the two materials of different refractive index is the host material.

4. A device according to claim 1 in which the host material is a nematic liquid crystal, and the guest material aligns itself with its preferred direction of polarisation parallel to the axis of alignment of the molecules of the host material.

5. A device according to claim 1 in which the host material is a cholesteric liquid crystal, and the guest material align itself with its preferred direction of polarisation parallel to the helical axis of the host material.

6. A device according to claim 1 in which the guest material is a perylene diester.

7. A device according to claim 6 in which the guest material is di-n-butyl perylene dicarboxylate.

8. A device according to claim 1 in which radiation incident on the device is absorbed by the liquid crystal host material, an energy transfer mechanism between the guest material and the liquid host material causing fluorescence of the guest material.

9. A device according to claim 1 including a diffuser effective to increase the emission angle of the radiation emitted by the guest material.

10. A device according to claim 1 including two or more different luminescent guest materials effective to emit radiation of differing wavelengths.

* * * * *